_United States Patent_ [19]

Ewing et al.

[11] Patent Number: 4,627,665

[45] Date of Patent: Dec. 9, 1986

[54] COLD-HEADED AND ROLL-FORMED PICK TYPE CUTTER BODY WITH CARBIDE INSERT

[75] Inventors: Paul E. Ewing, Farmington Hills, Mich.; B. Randall Grubb, Everett, Pa.

[73] Assignees: SS Indus., Plymouth, Mich.; Kennametal, Inc., Latrobe, Pa.

[21] Appl. No.: 719,764

[22] Filed: Apr. 4, 1985

[51] Int. Cl.⁴ .................... E21C 35/18; B21K 5/01
[52] U.S. Cl. .................... 299/79; 299/86; 175/410; 175/411; 72/356; 72/377; 72/68; 72/69; 76/101 A
[58] Field of Search .................... 299/86, 79, 92; 175/410, 411; 72/68, 69, 356, 377, 107, 108; 76/108 R, 108 A, 101 A; 29/DIG. 49

[56] References Cited

U.S. PATENT DOCUMENTS

| | | | |
|---|---|---|---|
| 2,748,464 | 6/1956 | Kaul | 72/356 X |
| 2,748,932 | 6/1956 | Kaul | 72/356 X |
| 2,819,629 | 1/1958 | Robinson | 72/377 X |
| 2,829,431 | 4/1958 | Brauchler | 72/69 |
| 3,356,418 | 12/1967 | Healey et al. | 175/411 |
| 3,499,685 | 3/1970 | Kniff | 299/92 |
| 3,631,706 | 1/1972 | Archer et al. | 72/377 X |
| 3,712,099 | 1/1973 | Elsbett et al. | 72/107 |
| 3,796,464 | 3/1974 | Hansen et al. | 299/86 |
| 4,078,415 | 3/1978 | Koch et al. | 72/356 |
| 4,485,655 | 12/1984 | Ewing | 175/354 X |

FOREIGN PATENT DOCUMENTS

| | | | |
|---|---|---|---|
| 2846744 | 4/1980 | Fed. Rep. of Germany | 299/86 |
| 2101657 | 1/1983 | United Kingdom | 299/79 |

_Primary Examiner_—Stephen J. Novosad
_Assistant Examiner_—Michael A. Goodwin
_Attorney, Agent, or Firm_—Reising, Ethington, Barnard, Perry & Milton

[57] ABSTRACT

A pick type bit is disclosed with an improved socket for a carbide insert. The cutter body of the bit is cold-headed from a steel blank to provide a cylindrical shank and a conical head with a socket in the forward end. The cylindrical shank is roll-formed to provide a retaining groove and an intermediate section is roll-formed to provide an extraction groove between the head and the shank. The cold-heading includes an initial step of squaring-up the forward end of the blank by cold-heading it into cylindrical shape with a flat forward end and then punching the socket. This provides a socket of densified work-hardened steel. The bit is completed by brazing the base of a carbide insert in mating relation with the socket in the head.

7 Claims, 10 Drawing Figures

COLD-HEADED AND ROLL-FORMED PICK TYPE CUTTER BODY WITH CARBIDE INSERT

FIELD OF THE INVENTION

This invention relates to pick type cutters or bits for use in mining or construction tools. More particularly, it relates to an improved mounting for a carbide cutting tip.

BACKGROUND OF THE INVENTION

In mining and construction operations, tools are used which have a rotatable head carrying a plurality of pick type cutters or bits. In a construction tool for a planing operation, for example, the head takes the form of a drum and is rotatably driven and carries a plurality of pick type bits disposed in a helical pattern on the surface thereof. For supporting each bit, the head carries a mounting or support block having a socket therein for retaining the bit. The bit has a cylindrical shank disposed in the socket and has a conical head extending beyond the block. A pointed cutting tip of wear resistant material such as cemented tungsten carbide is mounted on the outer end of the head. Each bit is rotatably supported in the support block and, due to inclination of the bits on the head, the bits are adapted to rotate during operation for the purpose of maintaining the tip in a pointed condition throughout the operating life of the bits. When a bit breaks or the cutting tip is used up or broken off, the bit is pried out of the support block and replaced by another bit. A tool of this general type for boring operations is described in the McKenry et al U.S. Pat. No. 3,720,273 granted Mar. 13, 1973.

In the prior art, as represented by the above-mentioned McKenry et al patent, the pick type cutters or bits have a cutter body or holder which comprises a cylindrical shank for insertion into the socket of the support block, a conical head adapted to receive the carbide cutting tip and a cylindrical section between the shank and the head. The shank is provided with an annular retaining groove and carries a keeper which retains the shank in the support block while allowing it to rotate. The cylindrical section between the head and the shank is provided with an annular extraction groove for receiving an extracting tool to pry the bit out of the block. The forward end or nose of the head is provided with a recess or socket for receiving the carbide insert or cutting tip.

The cutter body of the pick type cutter or bit of the prior art, as described in the McKenry et al patent, is made from steel stock by machining, as by a lathe or screw machine operation, to obtain the desired shape. This includes turning the retaining groove, extraction groove and the head to final shape as well as boring or drilling the socket for the cutting tip. The bit is completed by brazing the carbide cutting tip to the head. The bits made by this process are costly due to the several machining operations. Further, the resulting structure leaves much to be desired in respect to strength and other physical properties of the bit. Such bits have a relatively short life due to breakage, particularly at the braze between the carbide tip and the head. Also, the steel body lacks the desired toughness in the shank cylindrical section and head to suitably withstand the extremely high stresses imposed during tool operation.

An improved pick type bit is described in the Ewing U.S. Pat. No. 4,485,655 granted Dec. 4, 1984 and assigned to one of the assignees of this invention. As described in the Ewing patent, the entire cutter body is constructed of work-hardened steel. This is obtained by cold-heading the body to form an intermediate blank and then, after the cold-heading, the retaining groove and the extraction groove are roll-formed to final dimensions. The work-hardening results from the cold-heading and additionally work-hardening is obtained by the roll-forming of the grooves. Finally, the socket for carbide insert is formed by machining and the insert is brazed to the head. This process produces a steel body with superior toughness, relative to machined bodies, especially in the region of the retention groove and the extraction groove. Further, the cold-heading and roll-forming offer cost advantages relative to the screw machine operation described above.

It remains, however, that it is desired to produce the pick type bits at even lower cost and to obtain an improved structure which will result in prolonged life of the bits.

Accordingly, a general object of this invention is to provide a pick type bit which overcomes certain disadvantages of the prior art.

SUMMARY OF THE INVENTION

In accordance with this invention, a pick type bit is provided with an improved socket for a carbide insert and which affords a brazed joit of increased strength. This is accomplished by forming the socket by cold-heading the socket in the head of the cutter body. The carbide insert, having a configuration which mates with the socket, is joined to the socket by a brazing operation.

This invention resulted from an undertaking, for the purpose of cost savings in the manufacture of pick type bits, to form the cutter body from a cylindrical blank by cold-heading and roll-forming without any machining operations. The process of the above-mentioned Ewing patent has the merit of improved strength and toughness and cost savings attendant with cold-heading and roll-forming; however it was found that there was too much cost increment in the required chucking and drilling operation for making the socket. By using the cold-heading process of this invention for forming the socket and roll-forming the retaining and extraction grooves all machining operations are eliminated and the cost savings objective is achieved. It was discovered, however, that the cold-headed socket affords an advantage which was entirely unanticipated. When the carbide insert is brazed to the cold-headed socket, a strong brazed joint is achieved relative to a machined socket. Thus, the invention results in a low cost bit which exhibits a shear strength at the joint between the body and the insert which is equal to or greater than the above-mentioned prior art.

In accordance with the invention, a cylindrical steel blank is cold-headed to provide a cylindrical shank and a conical head with a socket in the forward end. The cylindrical shank is roll-formed to provide a retaining groove and an intermediate section is roll-formed to provide an extraction groove between the head and the shank. The bit is completed by brazing the base of a carbide insert in mating relation with the socket in the head. Further, the cold-heading includes an initial step of squaring-up the forward end of the blank by cold-heading it into cylindrical shape with a flat forward end and then punching the socket into the forward end.

Further, the cold-heading includes final sizing of the head by cold-forming with a die working against the wall of the socket and the forward end of the head. Further, the cold-heading includes, prior to punching the socket, the step of preforming a blank with a conical recess on the forward end thereof by a die working against the forward end of the blank. Further, the insert includes a flange between the base and the cutting tip and the annular flange is brazed to said conical recess.

Further, in accordance with the invention, a pick type bit is provided which comprises a unitary steel body with a cylindrical shank and a conical head and a cylindrical section between the shank and the head. The steel body is cold-headed to form the head with a cylindrical socket in the forward end thereof and to form said cylindrical shank and cylindrial section whereby the body comprises work-hardened steel. The shank is roll-formed after being cold-headed to form an annular retaining groove in the shank and the cylindrical section is roll-formed after being cold-headed to form an annular extraction groove in the section. The wall of said socket is formed of densified, work-hardened steel as a result of said cold-forming and is adapted to receive the base of a carbide cutting bit in mating relation with a brazed joint therebetween.

A more complete understanding of this invention may be obtained from the detailed description that follows taken with the accompanying drawings.

BEST MODE FOR CARRYING OUT THE INVENTION

Figure 1:
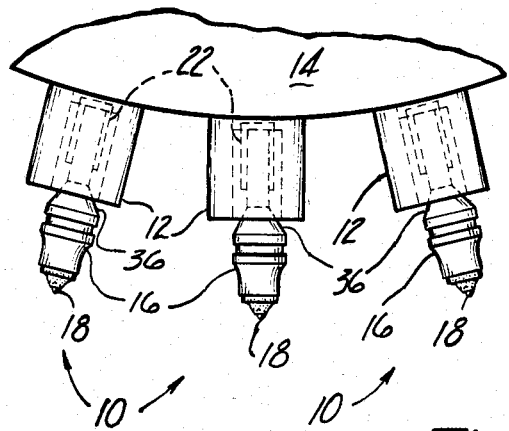
FIG. 1 shows the bit of this invention installed in a support block.

Referring now to the drawings, there is shown an illustrative embodiment of the invention in a particular pick type cutter or bit such as that used in planing tools for construction operations. It will be appreciated as the description proceeds that the invention may be used for bits of other configurations and for different applications.

The pick type cutter or bit 10 of this invention is shown in FIG. 1 installed in a support block 12 on the rotatable head or drum 14 of a cutting or planing tool. The bit 10 is retained in the support block 12 by a resilient keeper 22. The bit 10 comprises a holder or cutter body 16 with a tungsten carbide insert 18 at its outer end. It will be understood that the rotating drum 14 of the tool carries a plurality of such bits which are disposed in a helical path on the surface of the drum 14. In a planing operation, the head is rotated and advanced with the bits cutting the material being worked, such as concrete, rock or mineral formations. The bits are thus subjected to very large stresses and must exhibit great strength and toughness to avoid breakage.

Figure 2:
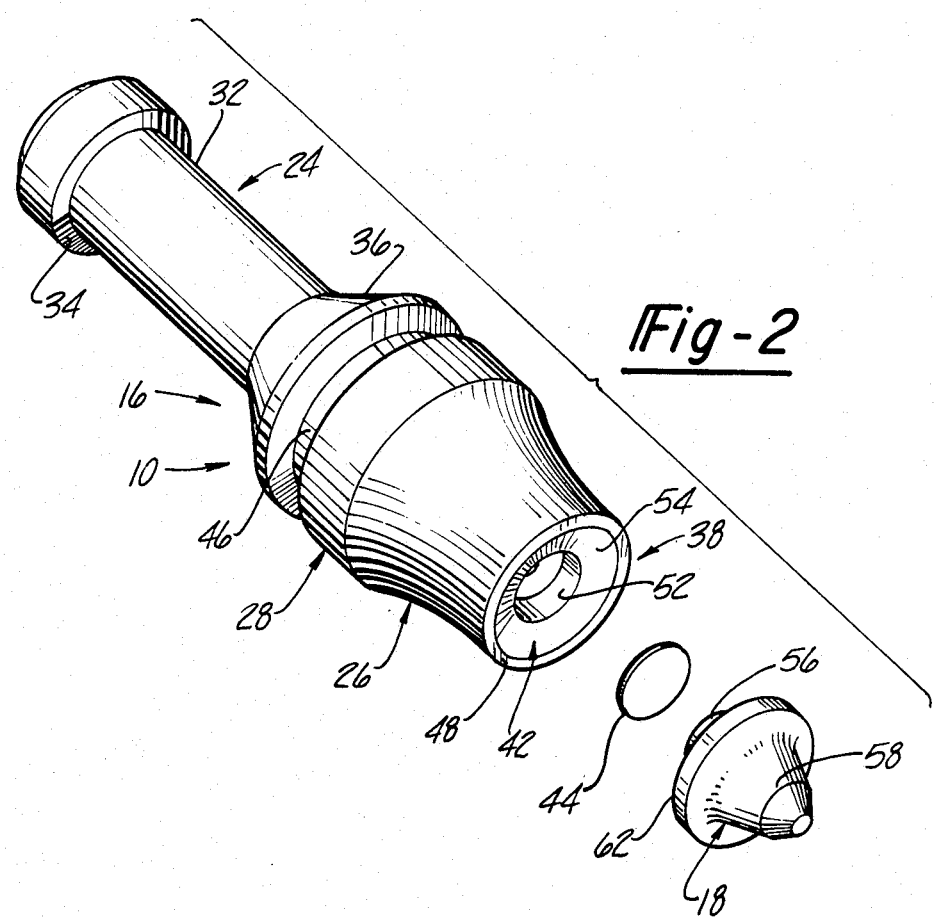
FIG. 2 is a perspective exploded view of the bit.
Figure 4:
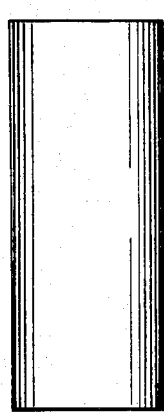
FIG. 4 is an elevation view of a cylindrical blank from which the cutter body of the bit is formed.

The cutter or bit 10, as best shown in FIG. 2, comprises a unitary steel holder or cutter body 16 with the tungsten carbide insert 18 mounted thereon. In the illustrative embodiment, the body 16 is made of SAE 4140 steel. The body 16 comprises a cylindrical shank 24 and a conical head 26 joined to the shank by a cylindrical intermediate section 28. The shank 24 is adapted to removably support the bit in the socket of the mounting block 12. For this purpose, the shank 24 is of circular cross-section and is provided with an annular retaining neck 32 extending between a square shoulder 34 at the rear of the shank and a chamfered shoulder 36 at the front of the shank. The neck 32 defines an annular groove in the shank 24 and is constructed of a roll-formed portion of the shank. The neck 32 is adapted to receive the resilient keeper 22 which retains the bit in the supporting block 12. The neck 32 is retained loosely by the keeper 22 to permit rotation of the bit in the block and to allow some freedom of axial motion in the block. This imposes severe strain and wear on the neck 32 of the shank.

The conical head 26 terminates in a free end face 38. The end face is provided with a socket 42 which receives the tungsten carbide insert 18 which is brazed thereto by use of a brazing wafer 44, as will be described subsequently. The conical head 26 is designed to resist the very large shearing and bending forces to which it is subjected during operation.

The cylindrical intermediate section 28 of the holder is circular in cross-section and includes an extracting neck 46 of reduced diameter which defines an annular groove in the cylindrical section 28. The neck 46 is adapted to receive an extracting tool for pulling the bit from the mounting block to replace it. The neck 46 is constructed of a roll-formed portion of the intermediate section 28.

The end face 38 of the head 26 comprises an annular rim 48 surrounding the socket 42. The rim 48 is formed of work-hardened material, as will be described subsequently. The socket 42 comprises a cylindrical hole 52 surrounded by a chamfered or beveled seating surface 54. The wall of the socket 42 is formed of a densified or compacted work-hardened steel, as will be described subsequently. The carbide insert 18 comprises a unitary body of tungsten carbide with a cylindrical base 56 and a cutting tip 58. The cylindrical base 56 is joined by an annular chamfered or beveled seating flange 62 to the tip 58. The cylindrical base 56 and the seating flange 62 correspond in configuration and conform to the wall of the socket 42. The carbide insert 18 is received in the socket 42 and brazed thereto in mating relationship, as described subsequently.

Figure 3:
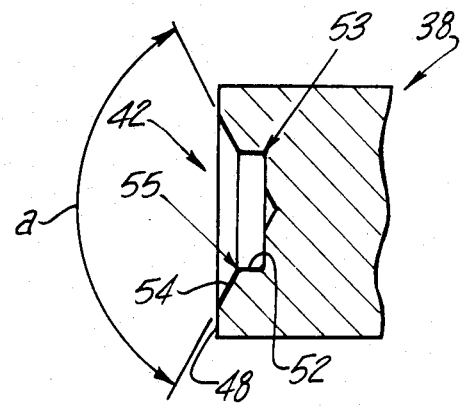
FIG. 3 shows the socket structure.

The configuration of the socket 42 is shown in FIG. 3. It has been found that this configuration can be formed by cold-heading, as by the cold-heading operations which will be described subsequently. Further, this configuration has been found satisfactory for receiving the carbide insert 18 with a good brazed joint with the socket. In the socket configuration, as shown in FIG. 3, the cylindrical hole 52 terminates in a flat bottom with the sidewall of the hole joined to the bottom by a fillet 53 of small radius. Further, the sidewall of the cylindrical hole 52 is joined with the beveled seating surface 54 by a corner 55 having a small radius. In contrast, the prior art bit in which the socket is formed by drilling, has no fillet allowance at the bottom of the hole and instead of a radius at the corner, the sidewall of the cylindrical hole and the beveled seating surface are joined by a flat chamfered shoulder. Further, the bottom of the hole, instead of being flat, has a central conical recess from the drill tip. In the illustrative embodiment, the socket 42 has a cylindrical hole 52 which is 0.158 to 0.165 inches deep and has a diameter of 0.368 with a tolerance of plus 0.002 and minus 0.003 inches. The beveled seating surface 54 has a cone angle "a" of 125 degrees and the outer diameter is in the range of 0.615–0.635 inches. The fillet 53 has a radius in the range of 0.010 to 0.015 inches. The corner 55 has a radius in the range of 0.065 to 0.073 inches. The body 16 has a length of about 2.86 inches and a head diameter at the nose of 0.78 to 0.81 inches. The extraction neck 46 is about 0.22 inches wide and the retaining neck 32 is about 1.24 inches long.

Figure 5:
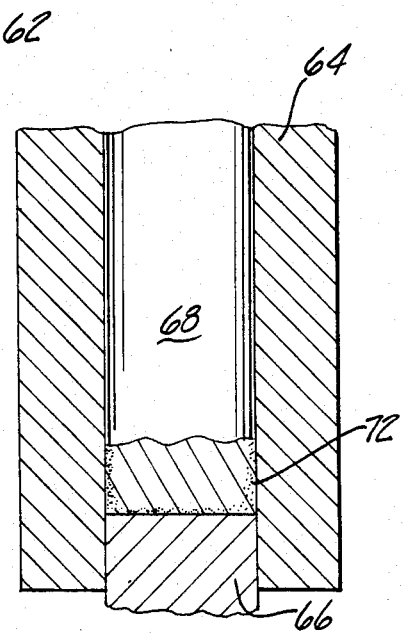
FIGS. 5, 6, 7 and 8 show intermediate blanks of the cutting body at intermediate stages in respective heading dies.

The cutter body 16 of the bit 10 is made by the following method, which will be described with reference to FIGS. 3 through 9. The holder is formed from a cylindrical steel blank 62, shown in FIG. 4. The blank 62 is upset or cold-headed in a number of operations as shown in FIGS. 5, 6, 7 and 8 to produce successive intermediate blanks. In the cold-heading operation, as shown in FIG. 5, the blank is squared-up to form an intermediate blank 68. In this step, the blank 62 is placed in a gripping die 64 and is cold-headed by the heading pin or die 66 to form the intermediate blank 68. This cold-heading operation produces a work-hardened casing or rim 72 at the forward end of the intermediate blank 68. The rim 72 exhibits a high degree of strength and toughness due to the work-hardening which serves to prevent splitting of the forward end during the subsequent punching operation to form the cylindrical hole 52 of the socket 42, which will be described subsequently.

Figure 6:
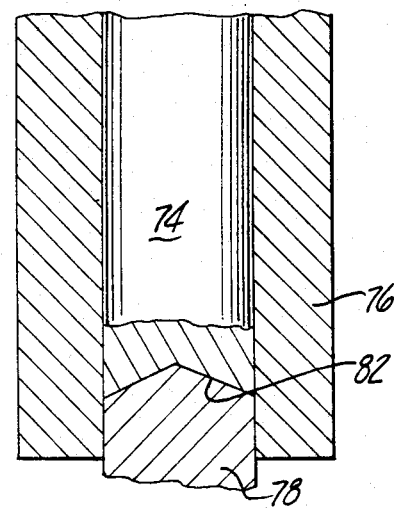

In the cold-heading operation depicted in FIG. 6, the intermediate blank 68 is preformed to provide an intermediate blank 74. In this cold-heading operation, the intermediate blank 74 is held in a gripping die 76 and is cold-headed by a heading pin or die 78 to form a conical recess 82 on the forward end of the blank 74.

Figure 7:
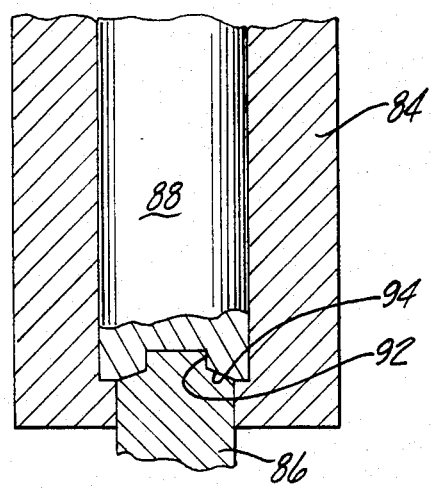

After the preforming step of FIG. 6, the intermediate blank 74 is cold-headed, as shown in FIG. 7, in a hole-forming operation. For this purpose, the blank 74 is placed in a gripping die 84 and is cold-headed by a heading punch or die 86. This provides an intermediate blank 88 having a central cylindrical hole 92 surrounded by an annular chamfered or beveled surface 94 on the forward end of the intermediate blank 88.

Figure 8:
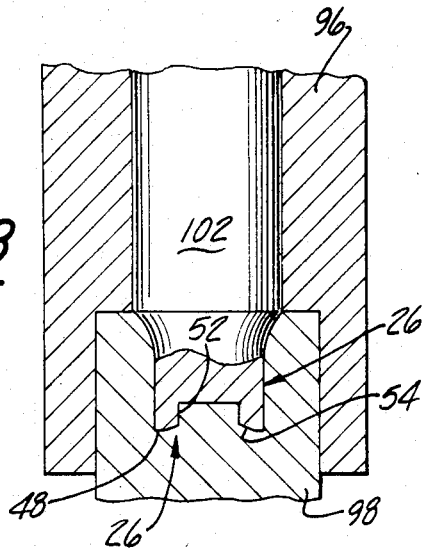

The intermediate blank 88 is cold-headed to provide final sizing as depicted in FIG. 8. For this purpose, the intermediate blank is held in a gripping die 96 and is cold-headed by a heading die 98. This cold-heading operation provides the conical head 26 with its final dimensions. This includes the socket 42 comprising the cylindrical hole 52 surrounded by the chamfered or beveled seating surface 54. The socket 42 is surrounded by the rim 48 which terminates in a flat forward end. It has been found that the squaring-up step of FIG. 5 is effective to permit the punching step of FIG. 7 to be performed without causing splitting of the forward end of the intermediate blank. It is believed that the work-hardening of the casing 72, indicated in FIG. 5, provides a toughness and strength which is effective to resist splitting during the punching operation.

Figure 9:
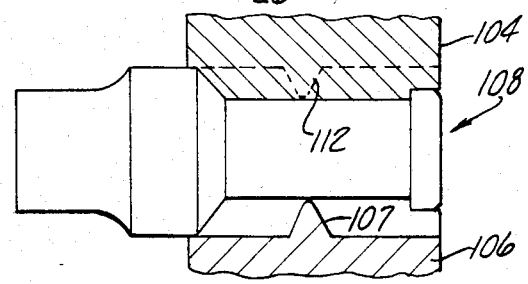
FIG. 9 depicts a roll-forming tool for providing the retaining groove on the holder.

The retaining neck 32 is formed to its final dimensions by roll-forming the intermediate blank 102 as depicted in FIG. 9. The roll-forming is preferably performed by flat dies in a cold-forming or warm-forming operation. The roll-forming operation uses a reciprocating upper die 104 and a stationary lower die 106 with the intermediate blank disposed therebetween. The stationary die 106 is provided with a ridge 107 and the reciprocating die 104 is provided with an oppositely disposed ridge 112. The ridges 107 and 112 extend parallel to each other and in a direction perpendicular to the axis of the intermediate blank. The ridge 107, as illustrated, has a triangular cross-section of small height at one end (the near end) and has a substantially rectangular cross-section at the other end (far end). The ridge 112 has a triangular cross-section of small height at the far end and a substantially rectangular cross-section at the near end. The intermediate blank is loaded into position between the dies with the ridges 107 and 112 engaging the shank at the respective triangular cross-sections. The reciprocating die 104 is advanced relative to the stationary die 106 (into the paper, as viewed in FIG. 9) and the blank is rolled therebetween to progressively form the neck 32 (FIG. 2) in the surface of the shank. This rolling displaces the metal of the shank in such a manner that the diameter of the neck is reduced and the axial length of the shank is increased. This produces the intermediate blank 108. Because of the large amount of material displaced in the illustrative embodiment, the roll-forming is preferably performed as a warm-forming operation at a temperature in the range of 550 degrees F to 1200 degrees F. At the selected elevated temperature for warm-forming, a significant amount of strain-hardening occurs which improves the strength and toughness of the neck 32. It will be understood that in other cutter body designs with a shorter neck with less metal to be displaced, the roll-forming may be performed cold, i.e. at room temperature.

Figure 10:
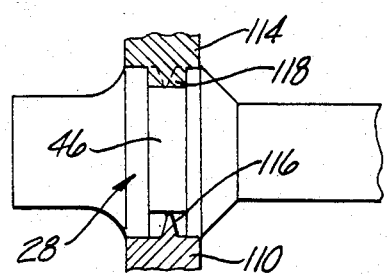
FIG. 10 depicts a roll-forming tool for providing the extracting groove on the holder.

After the roll-forming of the retaining neck 32, the extraction neck 46 is roll-formed to its final dimensions as shown in FIG. 10. The roll-forming operation is performed in the same manner as that described with reference to FIG. 8 and is suitably cold-formed. The roll-forming operation utilizes a flat stationary die 110 and a reciprocating die 114. The stationary die 110 has a ridge 116 and the reciprocating die 114 has a ridge 118. The intermediate blank 108 is placed between the dies and the rolling operation displaces the metal of the intermediate section in such a manner that the diameter of the neck 46 is reduced and the axial length of the intermediate section 28 is increased. The roll-forming operation produces a significant amount of strain-hardening which improves the strength and toughness of the neck 46. The cutter body 16 is thus formed to its final dimensions.

The final step of making the bit 10 is that of mounting the carbide insert 18 on the cutter body 16. For this purpose, the brazing wafer or ring 44 is disposed in the socket 42 and the carbide insert 18 is placed over the ring in the socket. The brazed joint between the carbide insert 18 and the parent metal of the socket 42 is produced by suitable heating to the brazing temperature. In the illustrative embodiment, the brazing operation is as follows. The braze alloy is SAE Standard AMS-4764 which is manufactured by Handy and Harmon of Fairfield Company and sold under the name "HI-TEMP 095". The brazing flux is known as "SUPERIOR 612" manufactured by Superior Flux Manufacturing Company of Cleveland, Ohio. With the braze alloy wafer inserted in the socket, the flux is applied and the carbide insert is placed in the socket. The parts are heated by induction heating to a temperature in the range of 1750 to 1950 degrees F in a time period which may range from 36 to 48 seconds. The parts are then held by an induction heater at a temperature in the range of 1550 to 1700 degrees F for a time period which may range from 90 to 120 seconds. Then, the parts are oil-quenched. Next, the parts are tempered at a temperature in the range of 700 to 800 degrees F in a cycle that lasts about one and one-half hours. A brazed joint which exhibits exceedingly high shear strength is obtained between the carbide tip and the compacted and densified steel of the socket.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. The method of making a bit comprising a cutter body and a carbide insert having a cylindrical base and a cutting tip with an annular beveled seating flange between the base and the tip, said cutter body being of the type comprising a unitary steel body including a cylindrical shank for supporting said bit and a conical head with a socket in the end thereof adapted to receive said insert, said method comprising the steps of:

cold-heading a cylindrical steel blank to provide an intermediate blank with a cylindrical shank and a conical head with a socket in the forward end of the head, said cold-heading including the steps of squaring-up the forward end of said blank by cold-heading thereof into cylindrical shape with a flat forward end, preforming said blank with a conical recess on the forward end thereof by a forming die working against the forward end of said blank, and punching a cylindrical hole into the central portion of said conical recess leaving an annular beveled seating surface surrounding said hole, reducing said cylindrical shank by roll-forming to provide a neck defining a first annular groove in the shank, reducing said cylindrical shank by roll-forming to provide a neck defining a second annular groove between the head and said first annular groove, and brazing the base and seating flange of said carbide insert to the socket.

2. The invention as defined in claim 1 wherein said cold-heading includes:

final-sizing of said head by cold-forming with a forming die working against the wall of said socket and said forward end.

3. The invention as defined in claim 1 wherein said brazing is effected with braze alloy SAE AMS-4764.

4. The invention as defined in claim 3 wherein said brazing includes heating by an induction heater to a temperature in the range of 1750 to 1950 degrees F in a time period ranging from 36 to 48 seconds, holding the temperature in the range of 1550 to 1700 degrees F for a time period in the range of 90 to 120 seconds, quenching the brazed parts in oil, and tempering the brazed parts at a temperature in the range of 700 to 800 degrees F.

5. A cutting bit comprising a cutter body and a carbide insert, said cutter body comprising a unitary steel body including a cylindrical shank for supporting the bit and a conical head on said shank with a socket in the end thereof adapted to receive a carbide insert said socket comprising a cylindrical hole surrounded by a annular beveled seating surface, said steel body also including a cylindrical section between said shank and said head, said unitary steel body being cold-headed to form said conical head with said socket in the end thereof and to form said cylindrical shank and cylindrical section, whereby said steel body comprises work-hardened steel, said shank being roll-formed after being cold-headed to form an annular retaining groove in said shank, said cylindrical section being roll-formed after being cold-headed to form an annular extraction groove in said section, said socket being formed of densified, work-hardened steel as a result of said cold-forming and adapted to receive said carbide insert, said carbide insert having a cylindrical base and a cutting tip with an annular beveled flange between the base and the tip, said cylindrical base being disposed in said hole with said flange disposed opposite said seating surface, and a brazed joint between said base and said socket and between said flange and said socket.

6. The invention as defined in claim 5 wherein said brazed joint is effected with braze alloy SAE AMS 4764.

7. The invention as defined in claim 6 wherein said brazed joint is made by inserting said braze alloy and a flux into said socket, heating by an induction heater to a temperature in the range of 1750 to 1950 degrees F in a time period ranging from 36 to 48 seconds, holding the temperature in the range of 1550 to 1700 degrees F for a time period ranging from 90 to 120 seconds, quenching the brazed joint in oil and tempering the brazed joint at a temperature in the range of 700 to 800 degrees F.

* * * * *